United States Patent
Procaccioli et al.

(10) Patent No.: US 11,128,378 B2
(45) Date of Patent: Sep. 21, 2021

(54) DETERMINING A FIBEROPTIC NETWORK SIMULATION BASED ON WEIGHTED HIGHWAY SCORES

(71) Applicant: Accenture Global Solutions Limited, Dublin (IE)

(72) Inventors: Emanuele Procaccioli, Rome (IT); Concetta Balestra, Rome (IT); Michele Francesco Puccio, Rome (IT); Federica Di Castro, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/674,666

(22) Filed: Nov. 5, 2019

(65) Prior Publication Data

US 2021/0135756 A1 May 6, 2021

(51) Int. Cl.
*H04B 10/27* (2013.01)
*H04B 10/25* (2013.01)

(52) U.S. Cl.
CPC ....... *H04B 10/27* (2013.01); *H04B 10/25891* (2020.05)

(58) Field of Classification Search
None
See application file for complete search history.

(56) References Cited

U.S. PATENT DOCUMENTS

| | | | |
|---|---|---|---|
| 6,771,966 B1 * | 8/2004 | Chow | H04W 16/18 455/446 |
| 9,363,162 B1 * | 6/2016 | Zhou | H04L 45/123 |
| 2006/0072505 A1 * | 4/2006 | Carrillo | H04L 41/046 370/331 |
| 2009/0122710 A1 | 5/2009 | Bar-Tor et al. | |

(Continued)

FOREIGN PATENT DOCUMENTS

WO 2011133016 A2 10/2011

OTHER PUBLICATIONS

Co-pending U.S. Appl. No. 16/559,384, entitled "Network Design Platform," by Hassan Naseri et al., filed Sep. 3, 2019, 58 pages.

(Continued)

*Primary Examiner* — David W Lambert
(74) *Attorney, Agent, or Firm* — Harrity & Harrity, LLP

(57) ABSTRACT

The network simulation platform may determine a plurality of potential links to connect a plurality of target nodes to an existing fiberoptic infrastructure. The network simulation platform may determine a set of potential links, of the plurality of potential links, based on one or more criteria. The network simulation platform may determine, based on the set of potential links, an initial fiberoptic network simulation that includes one or more links. The network simulation platform may determine, for each link of the one or more links, a respective weighted highway score associated with the link and may determine, based on the initial fiberoptic network simulation and the respective weighted highway scores associated with the one or more links of the (Continued)

initial fiberoptic network simulation, a final fiberoptic network simulation. The network simulation platform may cause, based on the final fiberoptic network simulation, one or more actions to be performed.

20 Claims, 11 Drawing Sheets

(56) References Cited

U.S. PATENT DOCUMENTS

| | | |
|---|---|---|
| 2010/0305931 A1 | 12/2010 | Fordham |
| 2016/0359878 A1* | 12/2016 | Prasad .................... H04L 45/38 |
| 2016/0380892 A1 | 12/2016 | Mahadevan et al. |
| 2018/0123899 A1 | 5/2018 | Dorr et al. |

OTHER PUBLICATIONS

Extended European Search Report for Application No. EP20202679. 5, dated Mar. 29, 2021, 9 pages.

* cited by examiner

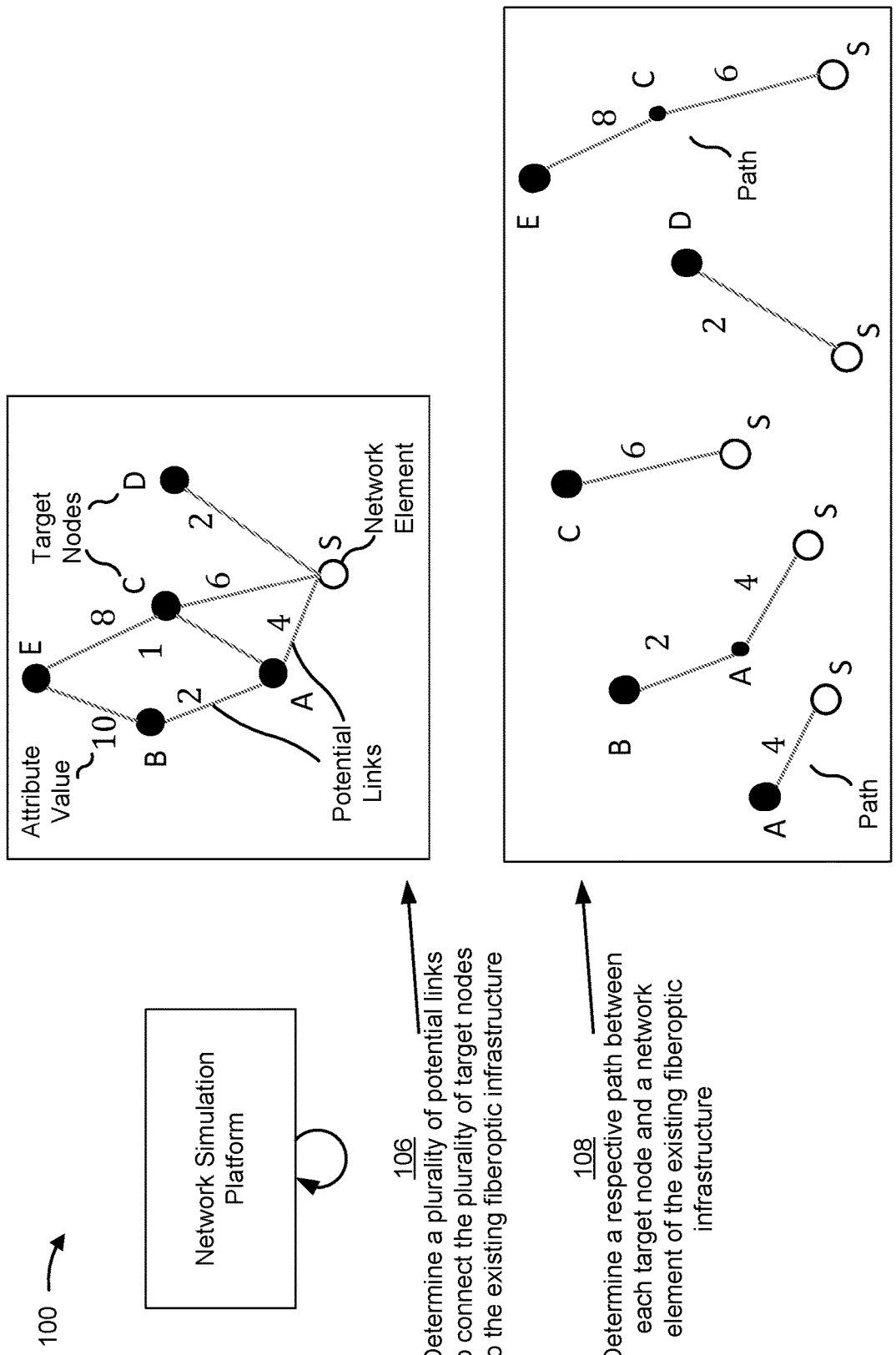

DETERMINING A FIBEROPTIC NETWORK SIMULATION BASED ON WEIGHTED HIGHWAY SCORES

BACKGROUND

Fiberoptic communication is a method of transmitting information from one place to another by sending pulses of light through an optical fiber. A fiberoptic network may route information between a plurality of nodes via a plurality of links comprised of optical fiber.

SUMMARY

According to some implementations, a method may include obtaining, by a device, node data related to a plurality of target nodes; obtaining, by the device, existing link data related to a plurality of links between at least some of the plurality target nodes; determining, by the device and based on the node data and the existing link data, a plurality of potential links to connect the plurality of target nodes; determining, by the device, a set of potential links, of the plurality of potential links, based on one or more criteria; determining, by the device and based on the node data, the existing link data, and the set of potential links, an initial network simulation that includes one or more links; determining, by the device and for each link of the one or more links, a respective weighted highway score associated with the link based on a number of subsequent downstream target nodes dependent on the link; determining, by the device and based on the initial network simulation and the respective weighted highway scores associated with the one or more links of the initial network simulation, a final network simulation; and causing, by the device and based on the final network simulation, one or more actions to be performed.

According to some implementations, a device may include one or more memories; and one or more processors, communicatively coupled to the one or more memories, configured to: obtain node data concerning a plurality of target nodes; obtain infrastructure data concerning an existing fiberoptic infrastructure; obtain configuration data concerning connecting the plurality of target nodes to the existing fiberoptic infrastructure; determine, based on the node data, the infrastructure data, and the configuration data, an initial fiberoptic network simulation that includes one or more links that connect the plurality of target nodes to the existing fiberoptic infrastructure; determine, for each link of the one or more links of the initial fiberoptic network simulation, a respective weighted highway score; determine, based on the initial fiberoptic network simulation and the respective weighted highways scores of the one or more links of the initial fiberoptic network simulation, a final fiberoptic network simulation; and cause, based on the final fiberoptic network simulation, one or more actions to be performed.

According to some implementations, a non-transitory computer-readable medium may store one or more instructions. The one or more instructions, when executed by one or more processors of a device, may cause the one or more processors to: obtain node data concerning a plurality of target nodes; obtain infrastructure data concerning an existing fiberoptic infrastructure; obtain geographic data concerning an area associated with the plurality of target nodes and the existing fiberoptic infrastructure; determine, based on the node data, the infrastructure data, and the geographic data, an initial fiberoptic network simulation that includes one or more links; determine, for each link of the one or more links of the initial fiberoptic network simulation, a respective weighted highway score; determine, based on the initial fiberoptic network simulation and the respective weighted highways scores of the one or more links of the initial fiberoptic network simulation, a final fiberoptic network simulation; determine, based on the final fiberoptic network simulation, new links to be constructed; and determine an estimated cost associated with constructing the new links.

BRIEF DESCRIPTION OF THE DRAWINGS

FIGS. 1A-1F are diagrams of one or more example implementations described herein.

DETAILED DESCRIPTION

Figure 1A:
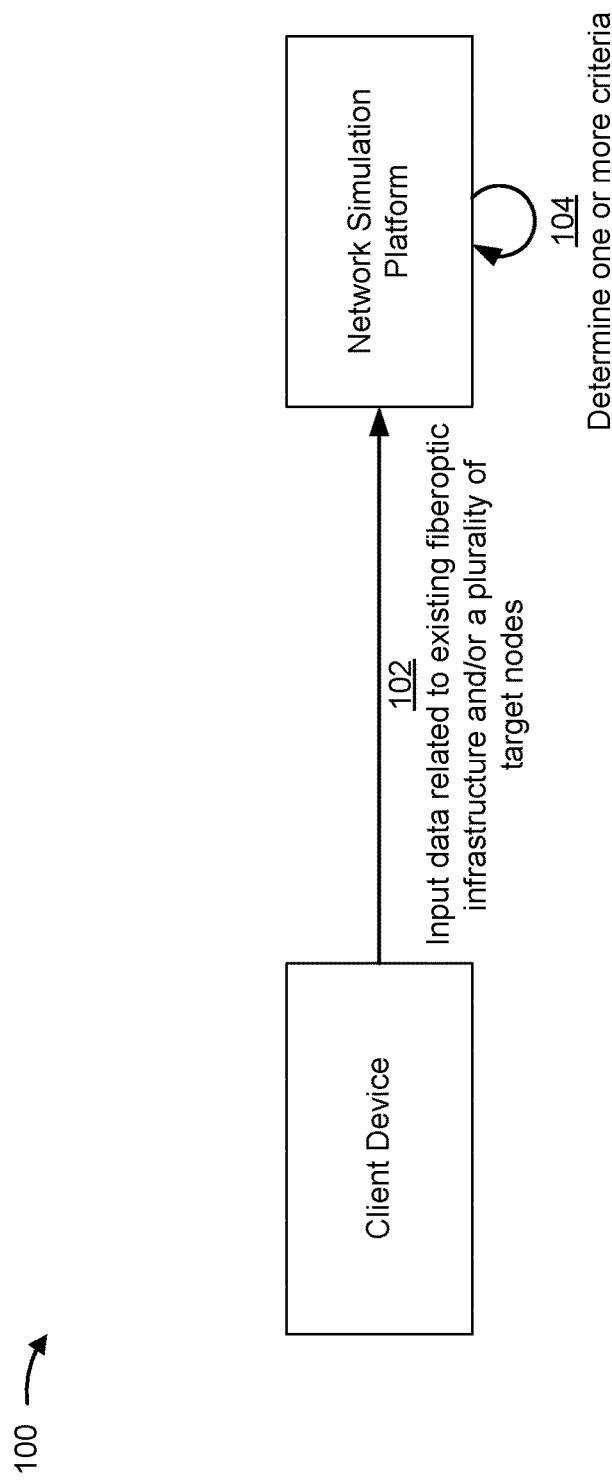

The following detailed description of example implementations refers to the accompanying drawings. The same reference numbers in different drawings may identify the same or similar elements.

A fiberoptic network may connect a plurality of nodes (e.g., buildings) via a plurality of links (e.g., a plurality of optical fibers). The fiberoptic network may include a plurality of network elements (e.g., point of presences (PoP) devices) that facilitate routing information among the plurality of nodes via the plurality of links.

Often, a fiberoptic network needs to be extended to connect to new target nodes. For example, a new link may need to be constructed to connect a target node (e.g., a building that has not yet been connected to the fiberoptic network) to the fiberoptic network. This process often involves digging a trench between the target node and the fiberoptic network, burying the new link (e.g., an optical fiber) in the ground (e.g., to protect the new link from being damaged), and physically connecting the new link to the target node and the fiberoptic network (e.g., via a network element of the fiberoptic network). This can be an expensive process (e.g., in terms of an amount of time, material, human labor, wear and tear on equipment, and/or the like). Further, in many cases, network planners may use computing resources (e.g., processing resources, memory resources, networking resources, power resources, and/or the like) of one or more client devices to design extensions to a fiberoptic network to determine where to construct new links.

Some implementations described herein provide a network simulation platform that enables automated fiberoptic network extension planning. In some implementations, the network simulation platform may obtain node data concerning a plurality of target nodes, infrastructure data concerning an existing fiberoptic infrastructure, and configuration data concerning connecting the plurality of target nodes to the existing fiberoptic infrastructure. In some implementations, the network simulation platform may determine, based on the node data, the infrastructure data, and the configuration data, an initial fiberoptic network simulation that includes one or more links that connect the plurality of target nodes to the existing fiberoptic infrastructure. In some implementations, the network simulation platform may determine, for each link of the one or more links of the initial fiberoptic network simulation, a respective weighted highway score and thereby determine a final fiberoptic network simulation that includes an optimized set of the one or more links of the initial fiberoptic network simulation. In some implementations, the network simulation platform may cause, based on the final fiberoptic network simulation, one or more actions to be performed, such as determine new links to be constructed to connect the plurality of target nodes to the existing fiberoptic infrastructure and an estimated cost associated with constructing the new links.

In this way, the network simulation platform may determine one or more fiberoptic network simulations to facilitate determining where links should be constructed to connect target nodes to an existing fiberoptic infrastructure. The network simulation platform, by using calculated weighted highway scores to determine the final fiberoptic network simulation, may ensure that per link cost and/or per link length is minimized and/or that links are used efficiently to connect target nodes to the existing fiberoptic infrastructure (e.g., links connect more than one target node when appropriate and/or that redundant or superfluous links are removed). Accordingly, some implementations described herein may reduce an overall expense (e.g., in an amount of material, human labor, wear and tear on equipment, and/or the like) associated with constructing new links (e.g., by reducing a total number and/or total length of new links to be added). Moreover, some implementations described herein may reduce a need for network planners to use computing resources to design extensions to a fiberoptic network.

Although some implementations are described herein in terms of determining a fiberoptic network simulation, implementations described herein may be used for any type of network simulation.

FIGS. 1A-1F are diagrams of one or more example implementations 100 described herein. As shown in FIGS. 1A-1F, example implementation(s) 100 may include a client device and/or a network simulation platform. In some implementations, the client device and/or the network simulation platform may be connected via a network, such as a wired network (e.g., the Internet or another data network), a wireless network (e.g., a wireless local area network, a wireless wide area network, a cellular network, etc.), and/or the like. Some example implementations described herein concern a single client device and/or a single network simulation platform, but implementations can include a plurality of client devices and/or a plurality of network simulation platforms.

As shown in FIG. 1A and by reference number 102, the network simulation platform may obtain input data (e.g., from the client device). The input data may relate to an existing network, an existing fiberoptic infrastructure, a plurality of target nodes, and/or the like. For example, the network simulation platform may obtain infrastructure data related to an existing fiberoptic infrastructure (e.g., a location of available fiberoptic infrastructure in an area that includes the plurality of target nodes). The infrastructure data may identify a single fiberoptic infrastructure network (e.g., that includes one or more network elements (e.g., one or more point of presence (PoP) network elements), one or more nodes, one or more links, and/or the like). Additionally, or alternatively, the infrastructure data may identify two or more separate fiberoptic infrastructure networks (e.g., where each fiberoptic infrastructure network is associated with a different operator and/or organization). As another example, the network simulation platform may obtain node data related to the plurality of target nodes. A target node may be a building, a point of interest (POI), and/or the like that is not already connected to the existing fiberoptic infrastructure. The node data may indicate a respective location (e.g., a physical address, a latitude and longitude, and/or the like) of each target node of the plurality of target nodes.

In an additional example, the network simulation platform may obtain configuration data concerning connecting the plurality of target nodes to the existing fiberoptic infrastructure. The configuration data may include one or more configuration parameters, such as a representative cost of a link per a unit of distance (e.g., an amount of dollars per foot, an amount of euros per meter, and/or the like to construct a link); a threshold link length (e.g., a minimum link length and/or a maximum link length in feet, meters, and/or the like); a threshold number of links that are able to connect to a target node (e.g., a maximum number of links that a node can support); a threshold number of target nodes that are able to connect to the existing fiberoptic infrastructure (e.g., a maximum number of target nodes that can be supported by the existing fiberoptic infrastructure); and/or the like. In another example, the network simulation platform may obtain geographic data concerning an area associated with the plurality of target nodes and the existing fiberoptic infrastructure. The geographic data may identify one or more roads, one or more railroad lines, other available infrastructure, and/or the like in the area associated with the plurality of target nodes and the existing fiberoptic infrastructure.

As shown by reference number 104, the network simulation platform may determine one or more criteria for determining a fiberoptic network simulation, as described herein. The one or more criteria may include a link cost criterion (e.g., a maximum estimated cost of a potential link); a link length criterion (e.g., a maximum estimated length of a potential link); a network cost criterion (e.g., a maximum estimated cost to construct a plurality of potential links); a network length criterion (e.g., a maximum total length of a plurality of potential links to be constructed); and/or the like. The network simulation platform may determine the one or more criteria by obtaining the one or more criteria from another device, such as the client device, by accessing a data structure that stores the one or more criteria, and/or the like.

As shown in FIG. 1B and by reference number 106, the network simulation platform may determine a plurality of potential links to connect the plurality of target nodes (e.g., to the existing fiberoptic infrastructure). For example, the network simulation platform may process the node data to identify the plurality of target nodes, may process the infrastructure data to identify the existing fiberoptic infrastructure, and may process the configuration data to identify the one or more configuration parameters. The network simulation platform may process the one or more configuration parameters to determine the plurality of potential links to connect the plurality of target nodes to the existing fiberoptic infrastructure. The plurality of potential links may connect the plurality of target nodes to the existing fiberoptic infrastructure via one or more network elements (e.g., one or more PoPs).

As another example, the network simulation platform may identify, based on the infrastructure data, two or more separate infrastructure networks and may combine the two or more separate infrastructure networks into a single infrastructure network (e.g., fuse the two or more separate infrastructure networks, add network elements at points where the two or more separate infrastructure networks intersect to connect the two or more separate infrastructure networks together, add links to connect the two or more separate infrastructure networks when the two or more separate infrastructure networks do not intersect, and/or the like). The network simulation platform may process the one or more configuration parameters to determine the plurality of potential links to connect the plurality of target nodes to the single infrastructure network. Additionally, or alternatively, the network simulation platform may identify, based on the node data, a respective location of each target node of the plurality of target nodes within an area associated with the single infrastructure network and may identify, based on the geographic data, a respective location of one or more roads in the area. The network simulation platform may determine, based on the respective location of each target node of the plurality of target nodes within the area and the respective location of each road of the one or more roads in the area, a plurality of potential links (e.g., that may be constructed along the one or more roads) to connect the plurality of target nodes to the single infrastructure network.

In some implementations, the network simulation platform may determine an attribute value associated with each potential link of the plurality of potential links (e.g., an estimated distance in feet, meters, and/or the like of the potential link; an estimated cost in dollars, euros, and/or the like of the potential link; and/or the like). For example, as shown in FIG. 1B, the network simulation platform may determine a plurality of potential links that connect a network element S of an existing fiberoptic infrastructure to target nodes A, B, C, D, and E and may determine that each potential link is associated with an attribute value (e.g., the SA potential link has an attribute value of 4, the AB potential link has an attribute value of 2, the BE potential link has an attribute value of 10, and/or the like).

As shown by reference number 108, the network simulation platform may determine a respective path (e.g., comprising one or more potential links) between each target node and a network element of the existing fiberoptic infrastructure. In some implementations, the network simulation platform may identify a set of potential links that includes potential links that are part of at least one respective path between each target node and the network element.

The network simulation platform may determine the respective path between each target node and the network element based on the respective attribute value associated with the plurality of potential links. The network simulation platform may process the respective attribute value associated with the plurality of potential links based on the one or more criteria to minimize a total distance and/or a total cost of the respective path between each target node and the network element. In some implementations, the network simulation platform may use a point-to-point routing algorithm, such as an A* search algorithm (e.g., a NetworkX A* search algorithm, a QGIS A* search algorithm, and/or the like), to determine the respective path between each target node and the network element. As shown in FIG. 1B, the network simulation platform may determine a path between network element S and target node A that includes potential link SA (and that has an attribute value of 4); a path between network element S and target node B that includes potential links SA and AB (with respective attribute values of 4 and 2); and/or the like.

Figure 1C:
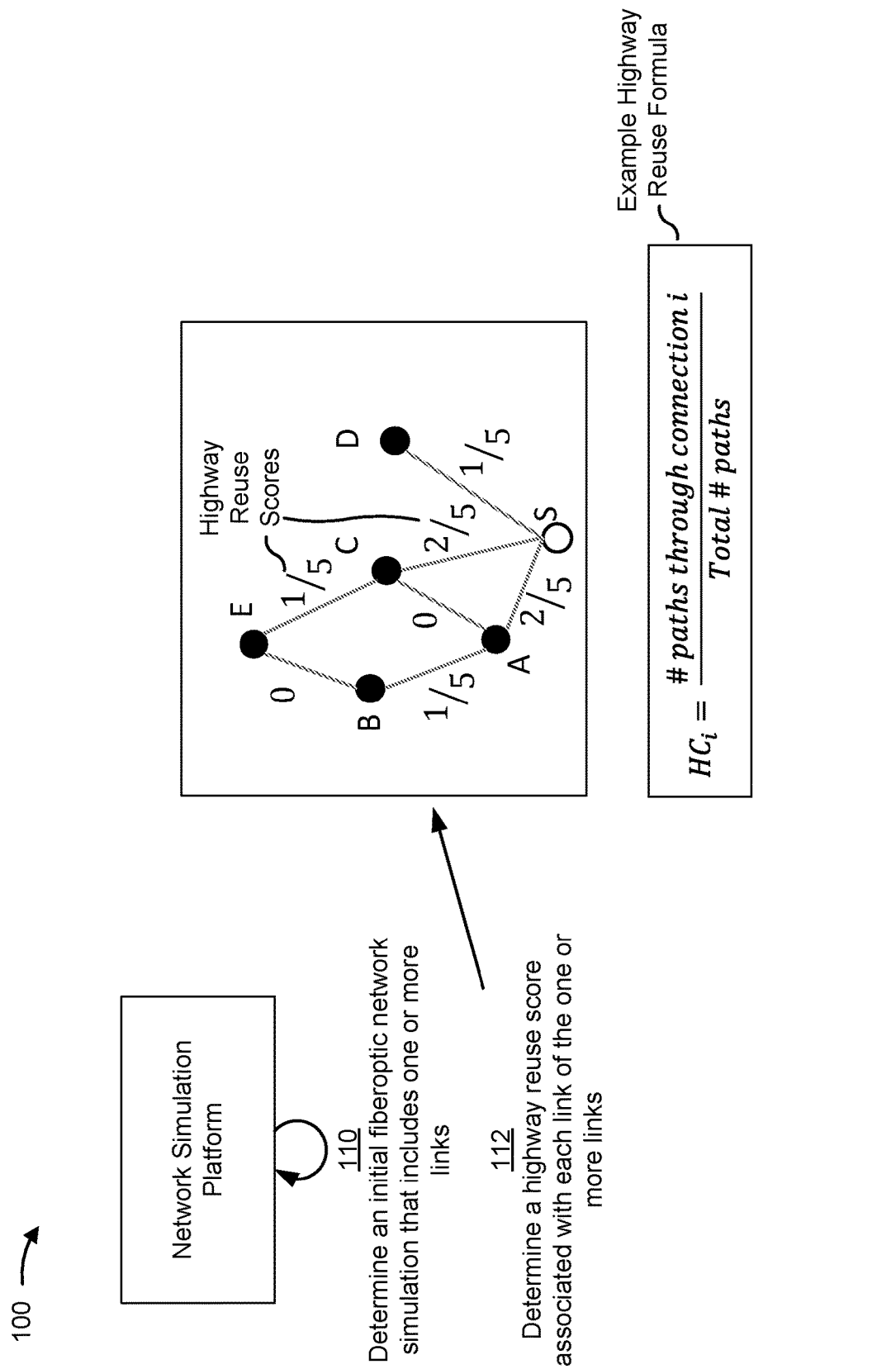

As shown in FIG. 1C and by reference number 110, the network simulation platform may determine an initial fiberoptic network simulation. The initial fiberoptic network simulation may include the plurality of target nodes, the existing fiberoptic infrastructure, one or more links (e.g. to connect the plurality of target nodes to the existing fiberoptic infrastructure), and/or the like. The one or more links may include the set of potential links (e.g., that are part of at least one respective path between each target node and the network element, as described herein in regard to reference number 108). In this way, only links that are necessary to connect the plurality of target nodes to network elements of the initial fiberoptic network simulation are included in the initial fiberoptic network simulation.

As shown by reference number 112, the network simulation platform may determine a highway reuse score (also referred to as a highway coefficient) associated with each link of the one or more links of the initial fiberoptic network simulation. A highway reuse score associated with a link may indicate a number of target nodes, of the plurality of target nodes, that are connected to a network element of the initial fiberoptic network simulation via the link. As shown in FIG. 1C, the network simulation platform may use the following formula to determine the highway reuse score ($HC_i$) of a link i:

$$HC_i = \frac{\text{\# paths through connection } i}{\text{Total \# paths}}.$$

For example, as shown in FIG. 1C, the network simulation platform may determine that a highway reuse score for a link SA between a network element S of the initial fiberoptic network simulation and a target node A is 2/5 (i.e., 0.4) because the link SA is used in two out of five paths associated with network element S and target nodes A, B, C, D, and E; may determine that a highway reuse score for a link CE between target nodes C and E is 1/5 (i.e., 0.2) because the link CE is used in one out of five paths associated with network element S and target nodes A, B, C, D, and E; may determine that a highway reuse score for a link AC between target nodes A and C is 0 because the link AC is not used in any path associated with network element S and target nodes A, B, C, D, and E; and/or the like.

Figure 1D:
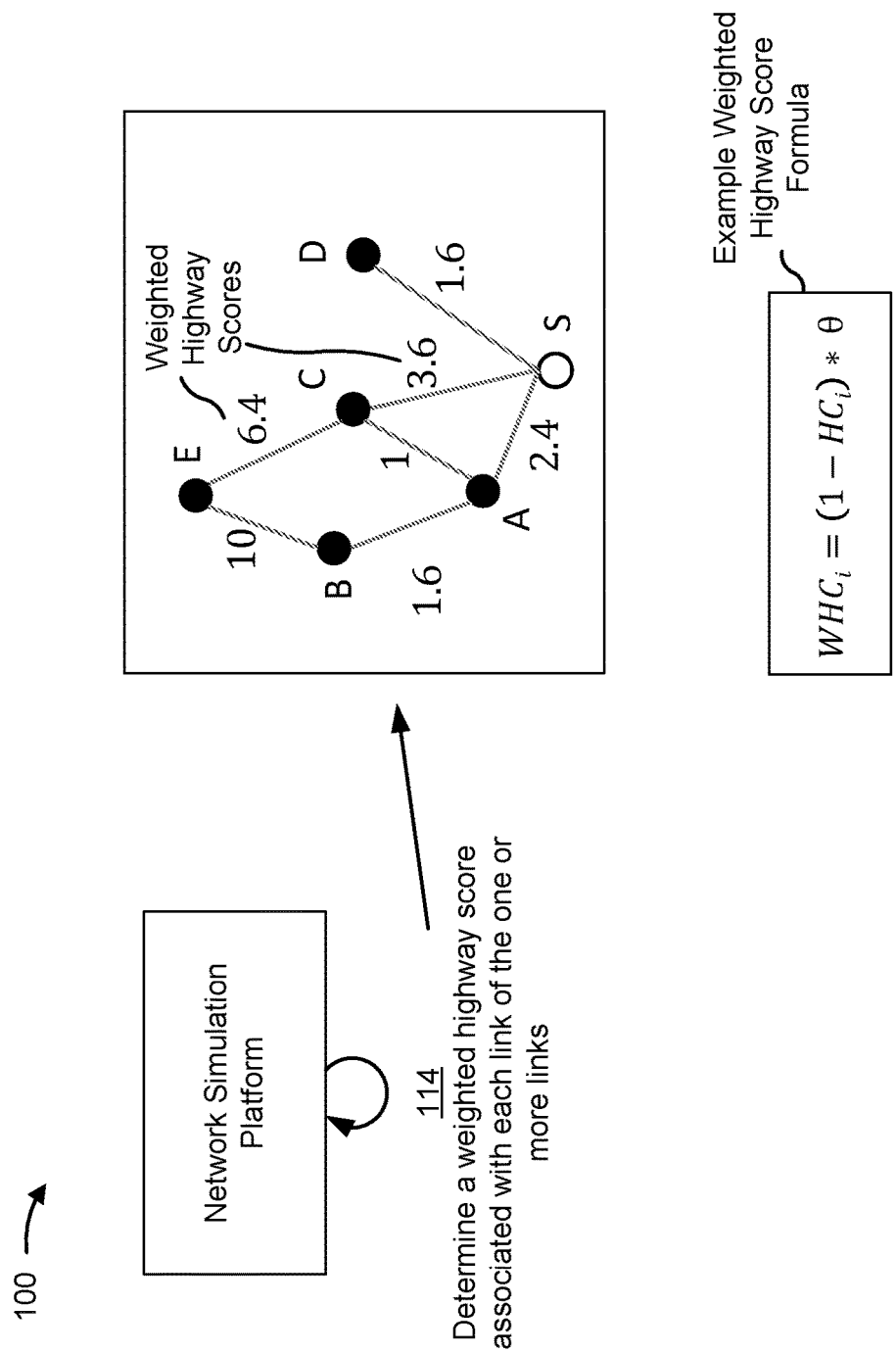

As shown in FIG. 1D and by reference number 114, the network simulation platform may determine a weighted highway score (also referred to as a weighted highway coefficient) associated with each link of the one or more links of the initial fiberoptic network simulation. The network simulation platform may determine the weighted highway score for a link based on the attribute value associated with the link and/or the highway reuse score associated with the link. For example, as shown in FIG. 1D, the network simulation platform may use the following formula to determine the weighted highway score ($WHC_i$) of a link i:

$$WHC_i = (1 - HC_i) * \theta,$$

where $HC_i$ is the highway reuse score associated with link i, and $\theta$ is the attribute value associated with link i.

For example, as shown in FIG. 1D, the network simulation platform may determine that a weighted highway score for a link SA between a network element S of the initial fiberoptic network simulation and a target node A is 2.4 because the link SA is associated with a highway reuse score of 2/5 and an attribute value of 4 (e.g., 2.4=(1−2/5)*4). As another example, the network simulation platform may determine that a weighted highway score for a link CE between a target node C and a target node E is 6.4 because the link CE is associated with a highway reuse score of 1/5 and an attribute value of 8 (e.g., 6.4=(1−1/5)*8).

Figure 1E:
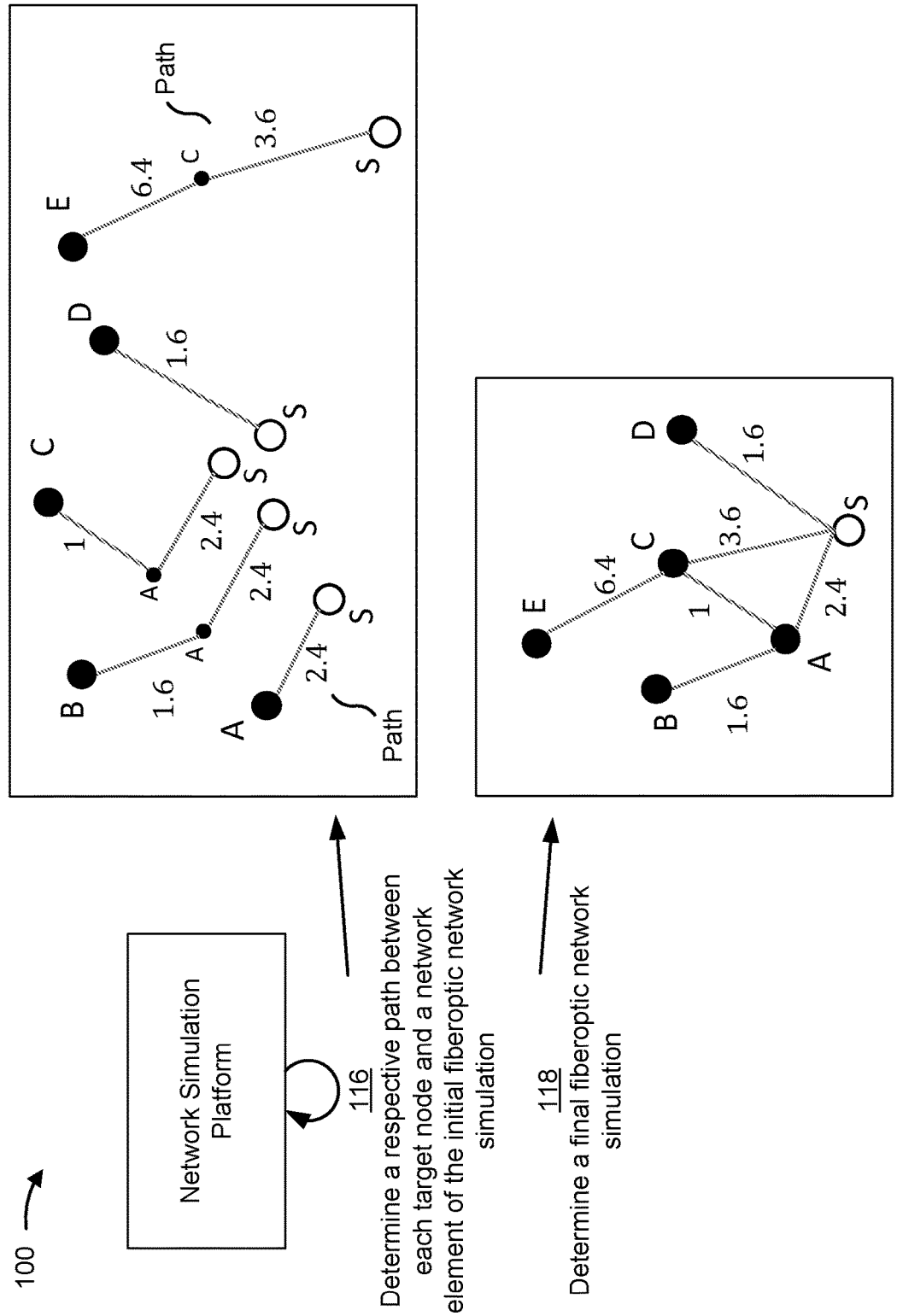

As shown in FIG. 1E and by reference number 116, the network simulation platform may determine a respective path between each target node and a network element of the initial fiberoptic network simulation (e.g., in a similar manner as described herein in relation to FIG. 1B and reference number 108). For example, the network simulation platform may use the one or more criteria to determine the respective path between each target node and the network element (e.g., based on the respective weighted highway scores of the one or more links). In some implementations, the network simulation platform may identify a set of links of the initial fiberoptic network simulation that includes links that are part of at least one respective path between each target node and the network element.

The network simulation platform may use a point-to-point routing algorithm, such as an A* search algorithm, to determine the respective path between each target node and the network element. As shown in FIG. 1E, the network simulation platform may determine a path between network element S and target node A that includes link SA (and that has a weighted highway score of 2.4); a path between network element S and target node B that includes links SA and AB (with respective weighted highway scores of 2.4 and 1.6); a path between network element S and target node C that includes links SA and AC (with respective weighted highway scores of 2.4 and 1); and/or the like.

As shown by reference number 118, the network simulation platform may determine a final fiberoptic network simulation. The final fiberoptic network simulation may include the plurality of target nodes, the existing fiberoptic infrastructure, one or more links (e.g. to connect the plurality of target nodes to the existing fiberoptic infrastructure), and/or the like. The one or more links may include the set of links of the initial fiberoptic network simulation (e.g., that are part of at least one respective path between each target node and the network element in the initial fiberoptic network simulation, as described herein in regard to reference number 116). In this way, only links that are necessary to connect the plurality of target nodes to network elements of the final fiberoptic network simulation are included in the final fiberoptic network simulation. For example, as shown in FIG. 1E, the final fiberoptic network simulation includes only links that are part of paths (e.g., based on weighted highway scores) between network element S and target nodes A, B, C, D, and E.

Figure 1F:
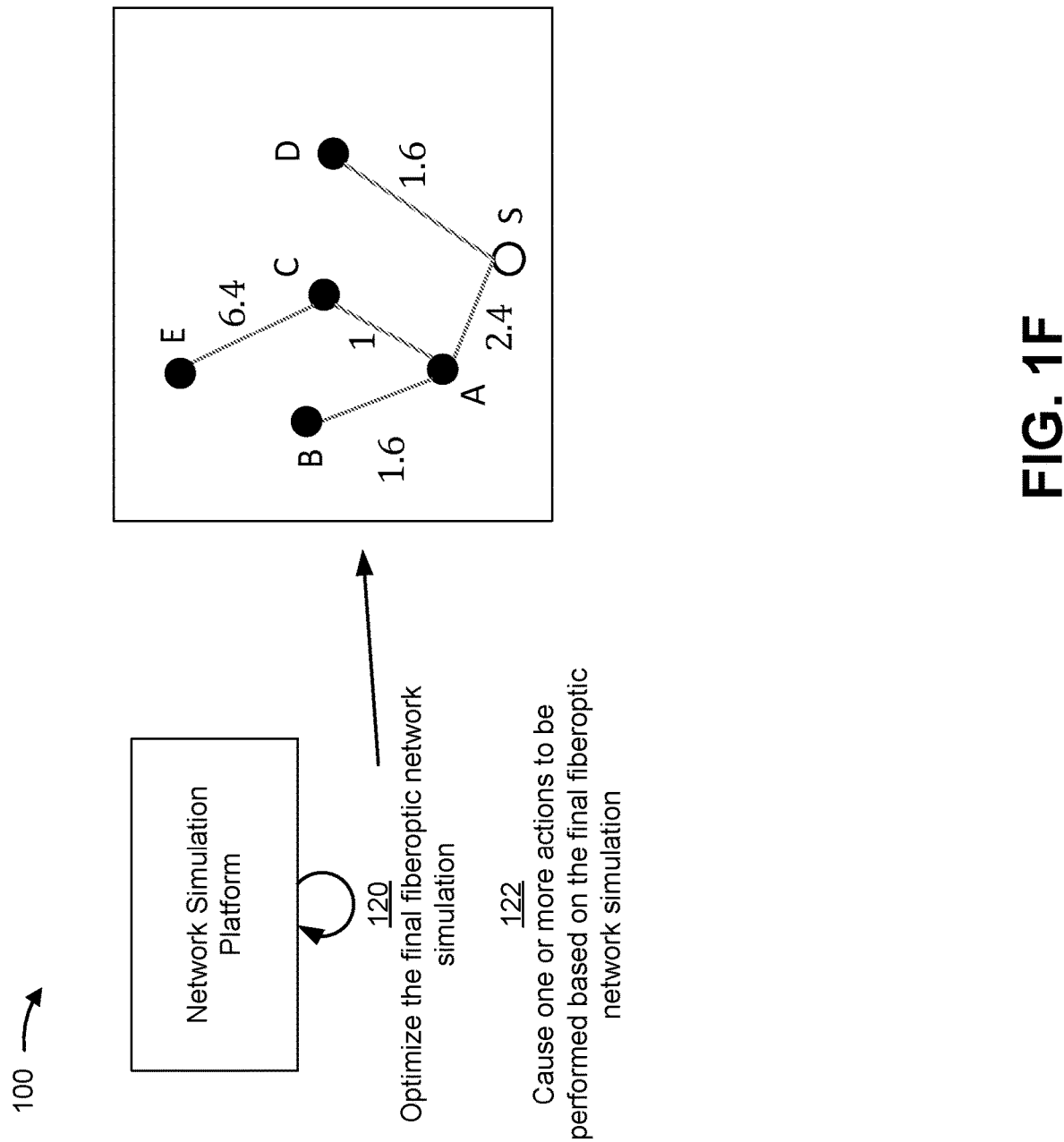

As shown in FIG. 1F and by reference number 120, the network simulation platform may optimize the final fiberoptic network simulation. For example, the network simulation platform may remove unnecessary or redundant links from the final fiberoptic network simulation (e.g., using a graph simplification technique, such as a minimum spanning tree (MST) algorithm (e.g., a NetworkX MST algorithm, a QGIS MST algorithm, and/or the like). The network simulation platform may optimize the final optic network simulation based on the respective weighted highway scores of the one or more links of the final fiberoptic network simulation. For example, as shown in FIG. 1F, the link SC (with a weighted highway score of 3.6) between network element S and target node C has been removed because a path from network element S to target node C via links SA and AC (with respective weighted highway scores of 2.4 and 1) has a total weighted highway score that is less than the weighted highway score of the link SC (e.g., 3.4 is less than 3.6). The link SC was not necessary to maintain a patch to target node C from network element S.

As shown by reference number 122, the network simulation platform may cause one or more actions to be performed based on the final fiberoptic network simulation. For example, the network simulation platform may determine that the one or more links of the final fiberoptic network simulation are new links to be constructed. Further, the network simulation platform may determine an estimated cost associated with constructing the new links (e.g., based on adding together the estimated cost of each link of the one or more links). The network simulation platform may send information related to the new links to be constructed and the estimated cost associated with constructing the new links to the client device, which may display the information on a display of the client device.

As another example, the network simulation platform may automatically communicate with another device, such as the client device, to purchase the new links (e.g., new optical fibers) and may cause the new links to be delivered at one or more particular locations (e.g., at one or more locations where network elements will connect to the plurality of target nodes via the new links). Moreover, the network simulation platform may generate a work order, a contract, and/or the like with an organization to construct, install, and/or maintain the new links. Additionally, or alternatively, the network simulation platform may generate and send a request for proposal to one or more organizations to request a quote concerning constructing, installing, and/or maintaining the new links. In another example, the network simulation platform may send instructions to one or more devices (e.g., autonomous or semi-autonomous devices) to construct, install, and/or maintain the new links.

As another example, the network simulation platform may identify and/or determine a different fiberoptic network simulation (e.g., the network simulation platform may obtain a manually designed fiberoptic network simulation from the client device) that includes alternative new links to be constructed. The network simulation platform may determine an estimated cost associated with constructing the alternative new links and may compare the estimated cost associated with constructing the new links (e.g., that are associated with the final fiberoptic network simulation) and the estimated cost associated with constructing the alternative new links. The network simulation platform may generate a recommendation based on the comparison (e.g., recommend the final fiberoptic network simulation when the estimated cost associated with constructing the new links is less than the estimated cost associated with constructing the alternative new links) and may send the recommendation to the client device, which may display the recommendation on the display of the client device.

In another example, the network simulation platform may determine that at least one link of the one or more links of the final fiberoptic network simulation crosses particular geographic features (e.g., rivers, streams, gorges, hills, mountains, and/or the like) that may cause construction challenges. The network simulation platform may send information identifying the at least one link to the client device, which may display information on the display of the client device.

While examples described herein concern the network simulation platform determining one or more fiberoptic network simulation for a single network element (e.g., network element S) and five target nodes (e.g., target nodes A, B, C, D, and E), implementations include the network simulation platform determining one or more fiber optic network simulations for multiple (e.g., tens, hundreds, thousands, millions, and/or the like) network elements and multiple (e.g., tens, hundreds, thousands, millions, and/or the like) target nodes. In this way, the network simulation platform may use a rigorous, computerized process to perform complex tasks that were not previously performed.

While some implementations described herein concern fiberoptic networks, additional implementations concern networks generally. For example, the network simulation platform may obtain existing link data related to a network (e.g., that may indicate a plurality of links between at least some of the plurality of target nodes) in a similar manner as described herein in relation to FIG. 1A. The network simulation platform may determine the plurality of potential links to connect the plurality of target nodes based on the existing link data in a similar manner as described herein in relation to FIG. 1B. Further, the network simulation platform may determine an initial network simulation (e.g., based on the existing link data) that includes one or more links and a weighted highway score associated with each link in a similar manner as described herein in relation to FIGS. 1C and 1D. The network simulation platform may determine a final network simulation and may cause one or more actions to be performed based on the final network simulation in a similar manner as described herein in relation to FIGS. 1E and 1F.

As indicated above, FIGS. 1A-1F are provided merely as an example. Other examples may differ from what is described with regard to FIGS. 1A-1F.

Figure 2:
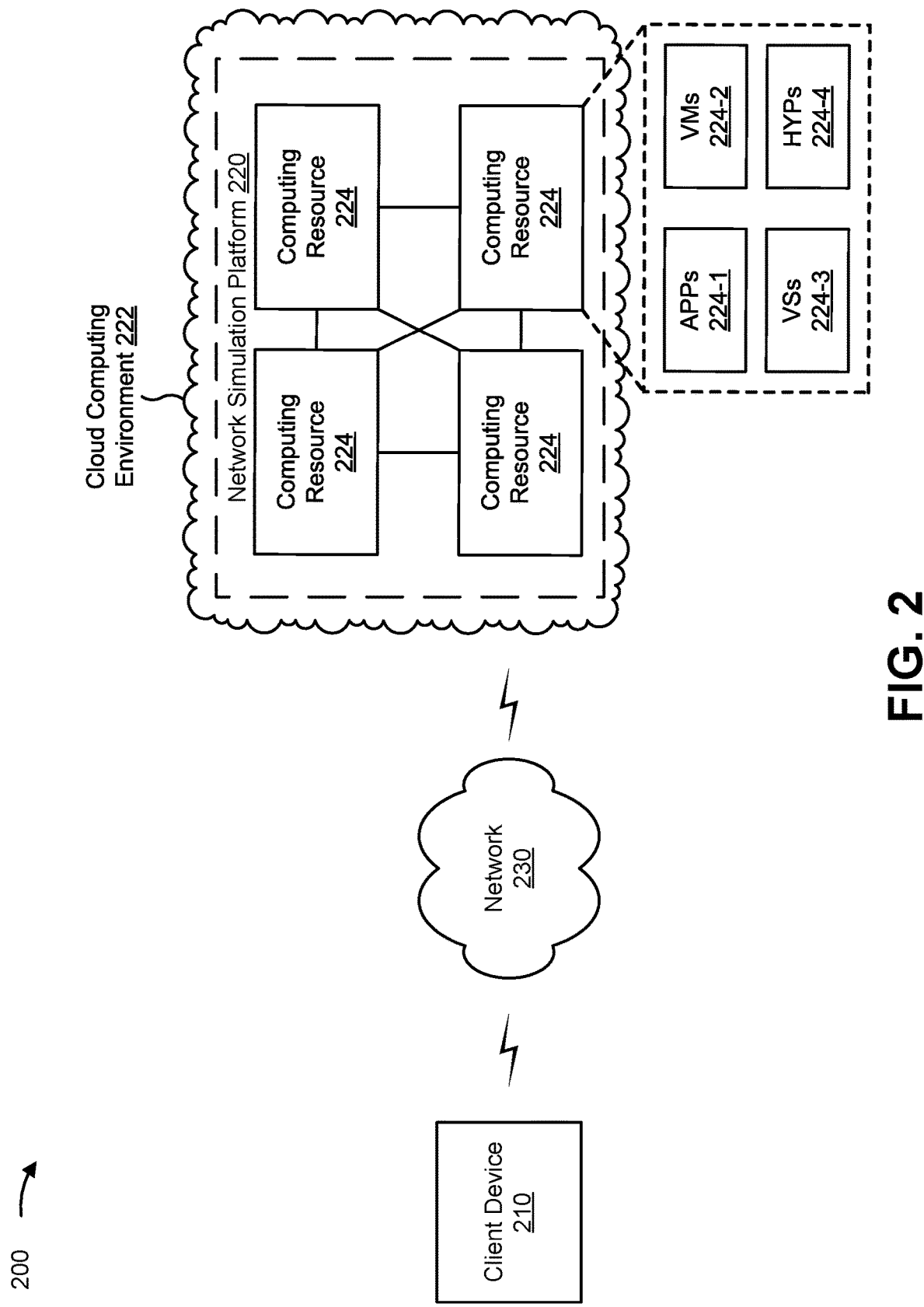
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a network simulation platform 220 in a cloud computing environment 222 that includes computing resources 224, a network 230, and/or the like. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, client device 210 may receive information from and/or transmit information to network simulation platform 220, and/or the like.

Network simulation platform 220 includes one or more devices that may determine a fiberoptic network simulation. In some implementations, network simulation platform 220 may be modular such that certain software components may be swapped in or out depending on a particular need. As such, network simulation platform 220 may be easily and/or quickly reconfigured for different uses. In some implementations, network simulation platform 220 may receive information from and/or transmit information to client device 210 and/or the like.

In some implementations, as shown, network simulation platform 220 may be hosted in a cloud computing environment 222. Notably, while implementations described herein describe network simulation platform 220 as being hosted in cloud computing environment 222, in some implementations, network simulation platform 220 may be non-cloud-based (i.e., may be implemented outside of a cloud computing environment) or may be partially cloud-based. For example, the network simulation platform may implemented on a client device, such as client device 210, or may be implemented by another processing platform.

Cloud computing environment 222 includes an environment that may host network simulation platform 220. Cloud computing environment 222 may provide computation, software, data access, storage, etc. services that do not require end-user knowledge of a physical location and configuration of system(s) and/or device(s) that host network simulation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host network simulation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with network simulation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of network simulation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
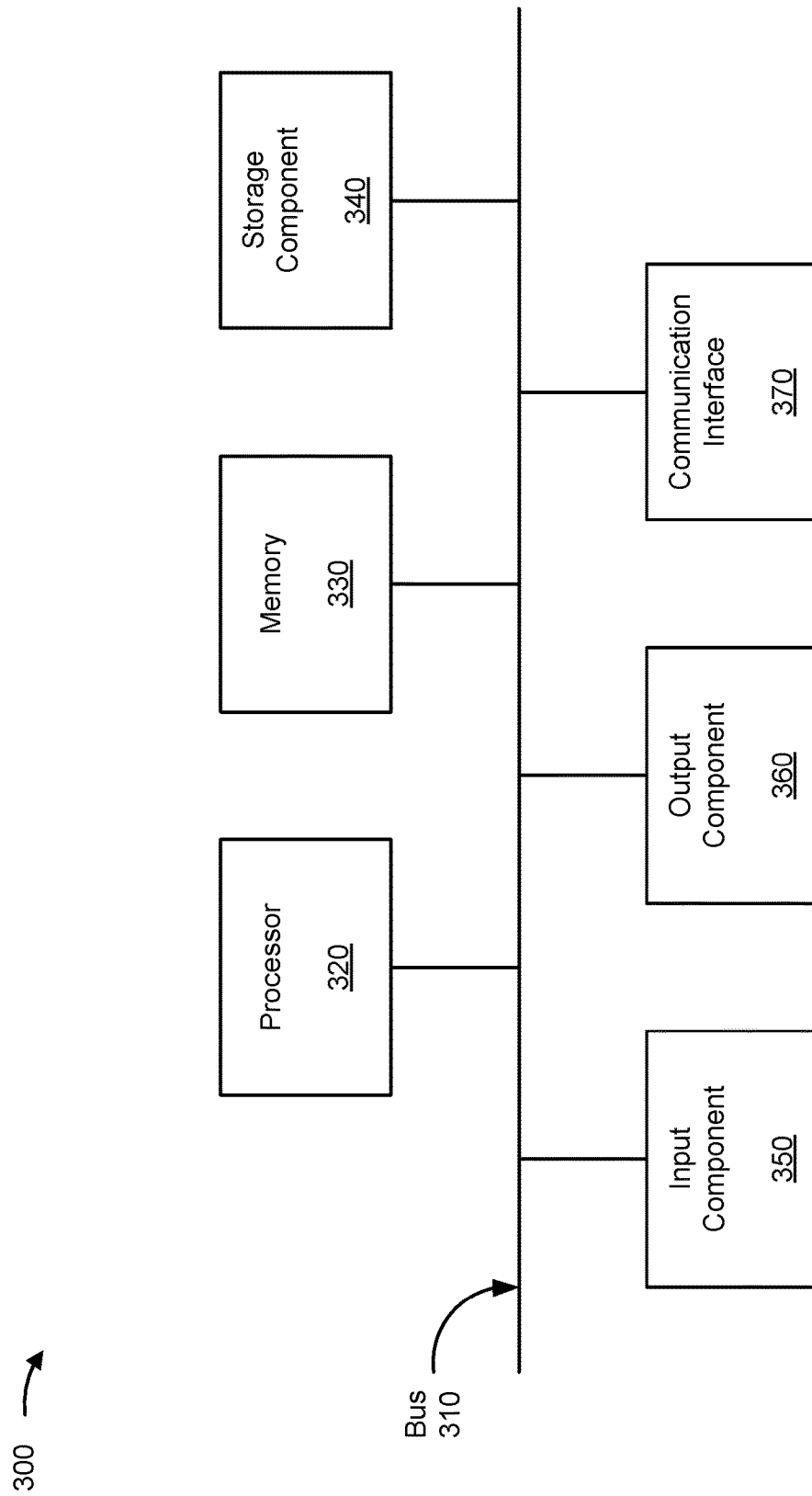
FIG. 3 is a diagram of example components of one or more devices of FIG. 2.

FIG. 3 is a diagram of example components of a device 300. Device 300 may correspond to client device 210, network simulation platform 220, and/or computing resource 224. In some implementations client device 210, network simulation platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
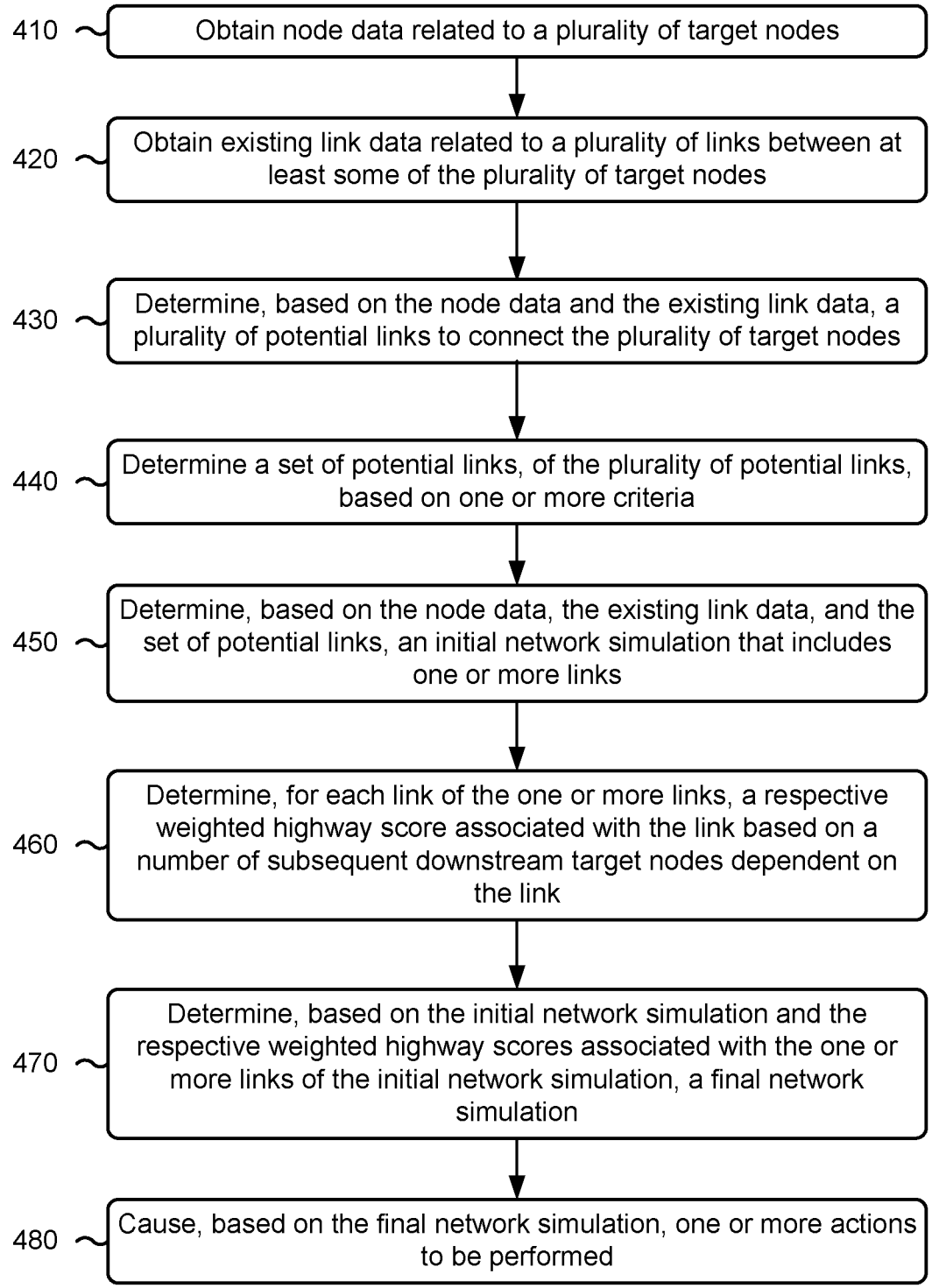
FIGS. 4-6 are flowcharts of example processes for determining a fiberoptic network simulation.

FIG. 4 is a flowchart of an example process 400 for determining a fiberoptic network simulation. In some implementations, one or more process blocks of FIG. 4 may be performed by a device (e.g., network simulation platform 220). In some implementations, one or more process blocks of FIG. 4 may be performed by another device or a group of devices separate from or including the device, such as a client device (e.g., client device 210) and/or the like.

As shown in FIG. 4, process 400 may include obtaining node data related to a plurality of target nodes (block 410). For example, the device (e.g., using computing resource 224, processor 320, memory 330, storage component 340, input component 350, output component 360, communication interface 370, and/or the like) may obtain node data related to a plurality of target nodes, as described above.

As further shown in FIG. 4, process 400 may include obtaining existing link data related to a plurality of links between at least some of the plurality of target nodes (block 420). For example, the device (e.g., using computing resource 224, processor 320, memory 330, storage component 340, input component 350, output component 360, communication interface 370, and/or the like) may obtain existing link data related to a plurality of links between at least some of the plurality of target nodes, as described above.

As further shown in FIG. 4, process 400 may include determining, based on the node data and the existing link data, a plurality of potential links to connect the plurality of target nodes (block 430). For example, the device (e.g., using computing resource 224, processor 320, memory 330, storage component 340, input component 350, output component 360, communication interface 370, and/or the like) may determine, based on the node data and the existing link data, a plurality of potential links to connect the plurality of target nodes, as described above.

As further shown in FIG. 4, process 400 may include determining a set of potential links, of the plurality of potential links, based on one or more criteria (block 440). For example, the device (e.g., using computing resource 224, processor 320, memory 330, storage component 340, input component 350, output component 360, communication interface 370, and/or the like) may determine a set of potential links, of the plurality of potential links, based on one or more criteria, as described above.

As further shown in FIG. 4, process 400 may include determining, based on the node data, the existing link data, and the set of potential links, an initial network simulation that includes one or more links (block 450). For example, the device (e.g., using computing resource 224, processor 320, memory 330, storage component 340, input component 350, output component 360, communication interface 370, and/or the like) may determine, based on the node data, the existing link data, and the set of potential links, an initial network simulation that includes one or more links, as described above.

As further shown in FIG. 4, process 400 may include determining, for each link of the one or more links, a respective weighted highway score associated with the link based on a number of subsequent downstream target nodes dependent on the link (block 460). For example, the device (e.g., using computing resource 224, processor 320, memory 330, storage component 340, input component 350, output component 360, communication interface 370, and/or the like) may determine, for each link of the one or more links, a respective weighted highway score associated with the link based on a number of subsequent downstream target nodes dependent on the link, as described above.

As further shown in FIG. 4, process 400 may include determining, based on the initial network simulation and the respective weighted highway scores associated with the one or more links of the initial network simulation, a final network simulation (block 470). For example, the device (e.g., using computing resource 224, processor 320, memory 330, storage component 340, input component 350, output component 360, communication interface 370, and/or the like) may determine, based on the initial network simulation and the respective weighted highway scores associated with the one or more links of the initial network simulation, a final network simulation, as described above.

As further shown in FIG. 4, process 400 may include causing, based on the final network simulation, one or more actions to be performed (block 480). For example, the device (e.g., using computing resource 224, processor 320, memory 330, storage component 340, input component 350, output component 360, communication interface 370, and/or the like) may cause, based on the final network simulation, one or more actions to be performed, as described above.

Process 400 may include additional implementations, such as any single implementation or any combination of implementations described below and/or in connection with one or more other processes described elsewhere herein.

In a first implementation, a weighted highway score associated with a link indicates a number of subsequent downstream target nodes, of the plurality of target nodes, that are dependent on the link.

In a second implementation, alone or in combination with the first implementation, the node data comprises building location data.

In a third implementation, alone or in combination with one or more of the first and second implementations, the existing link data comprises fiberoptic infrastructure data.

In a fourth implementation, alone or in combination with one or more of the first through third implementations, final network simulation comprises a fiberoptic network simulation.

In a fifth implementation, alone or in combination with one or more of the first through fourth implementations, causing the one or more actions to be performed comprises determining, based on the final network simulation, new links to be constructed; determining an estimated cost associated with constructing the new links, and sending information related to the new links to be constructed and the estimated cost associated with constructing the new links to a client device to allow the client device to display the information on a display of the client device.

In a sixth implementation, alone or in combination with one or more of the first through fifth implementations, the one or more criteria include at least one of a link cost criterion; a link length criterion; a network cost criterion; or a network length criterion.

In a seventh implementation, alone or in combination with one or more of the first through sixth implementations, determining the set of potential links, of the plurality of potential links, based on the one or more criteria comprises identifying one or more target nodes, of the plurality of target nodes, that are connected to a network element via one or more potential links of the plurality of potential links; determining, based on the one or more criteria, a respective path between the network element and each target node of the one or more target nodes, the respective path includes at least one potential link of the plurality of potential links; and determining the set of potential links, of the plurality of potential links, based on the respective paths associated with the one or more target nodes.

In an eighth implementation, alone or in combination with one or more of the first through seventh implementations, an A* search algorithm or a point-to-point routing algorithm is used by the device to determine the respective path between the network element and each target node of the one or more target nodes.

In a ninth implementation, alone or in combination with one or more of the first through eighth implementations, determining the final network simulation comprises: identifying a network element associated with the initial network simulation and one or more target nodes, of the plurality of target nodes, that are connected to the network element; determining, based on the respective weighted highway score associated with each link of the one or more links of the initial network simulation, a respective path between the network element and each target node of the one or more target nodes, and determining, based on the respective path between the network element and each target node of the one or more target nodes, the final network simulation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
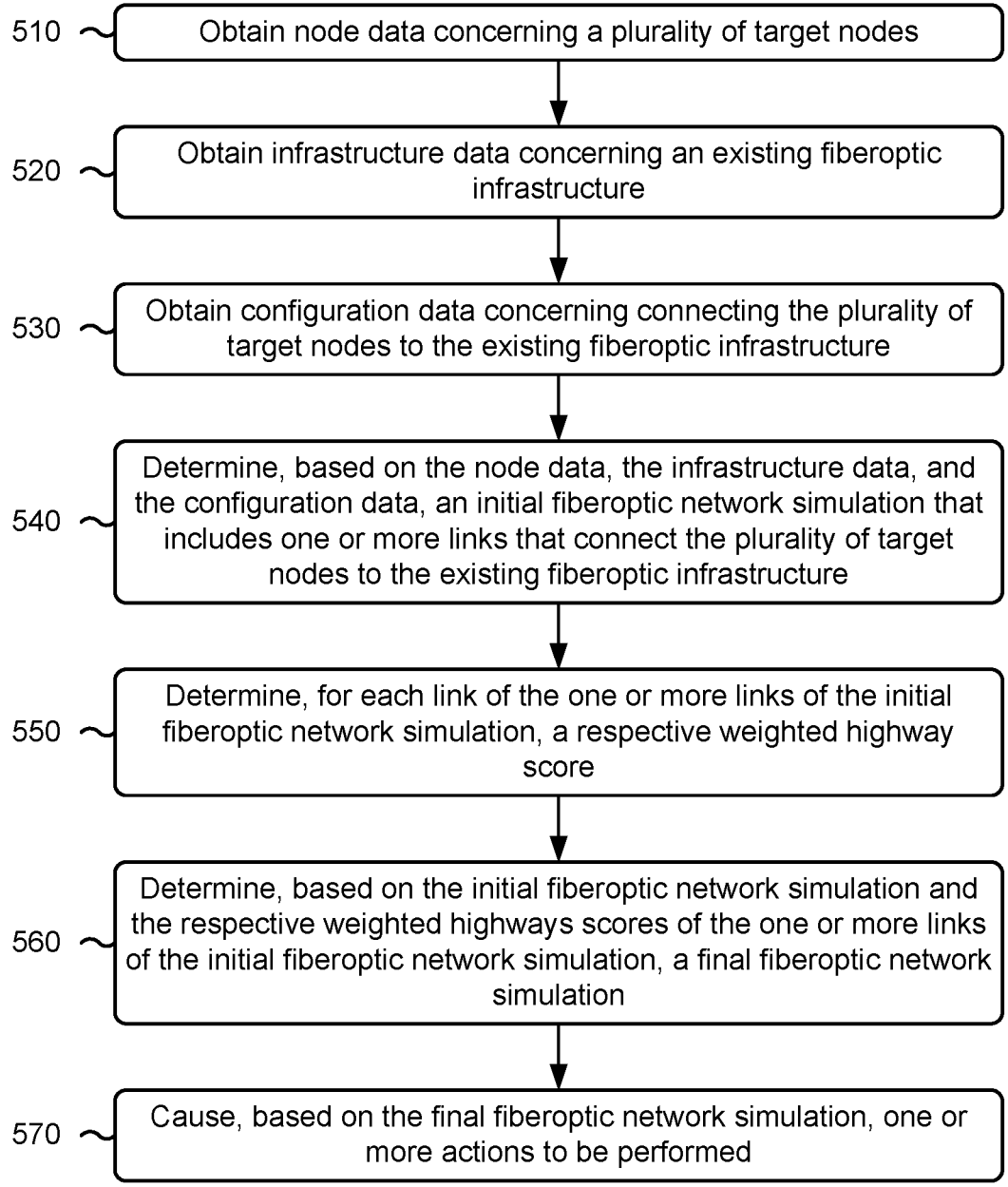

FIG. 5 is a flowchart of an example process 500 for determining a fiberoptic network simulation. In some implementations, one or more process blocks of FIG. 5 may be performed by a device (e.g., network simulation platform 220). In some implementations, one or more process blocks of FIG. 5 may be performed by another device or a group of devices separate from or including the device, such as a client device (e.g., client device 210) and/or the like.

As shown in FIG. 5, process 500 may include obtaining node data concerning a plurality of target nodes (block 510). For example, the device (e.g., using computing resource 224, processor 320, memory 330, storage component 340, input component 350, output component 360, communication interface 370, and/or the like) may obtain node data concerning a plurality of target nodes, as described above.

As further shown in FIG. 5, process 500 may include obtaining infrastructure data concerning an existing fiberoptic infrastructure (block 520). For example, the device (e.g., using computing resource 224, processor 320, memory 330, storage component 340, input component 350, output component 360, communication interface 370, and/or the like) may obtain infrastructure data concerning an existing fiberoptic infrastructure, as described above.

As further shown in FIG. 5, process 500 may include obtaining configuration data concerning connecting the plurality of target nodes to the existing fiberoptic infrastructure (block 530). For example, the device (e.g., using computing resource 224, processor 320, memory 330, storage component 340, input component 350, output component 360, communication interface 370, and/or the like) may obtain configuration data concerning connecting the plurality of target nodes to the existing fiberoptic infrastructure, as described above.

As further shown in FIG. 5, process 500 may include determining, based on the node data, the infrastructure data, and the configuration data, an initial fiberoptic network simulation that includes one or more links that connect the plurality of target nodes to the existing fiberoptic infrastructure (block 540). For example, the device (e.g., using computing resource 224, processor 320, memory 330, storage component 340, input component 350, output component 360, communication interface 370, and/or the like) may determine, based on the node data, the infrastructure data, and the configuration data, an initial fiberoptic network simulation that includes one or more links that connect the plurality of target nodes to the existing fiberoptic infrastructure, as described above.

As further shown in FIG. 5, process 500 may include determining, for each link of the one or more links of the initial fiberoptic network simulation, a respective weighted highway score (block 550). For example, the device (e.g., using computing resource 224, processor 320, memory 330, storage component 340, input component 350, output component 360, communication interface 370, and/or the like) may determine, for each link of the one or more links of the initial fiberoptic network simulation, a respective weighted highway score, as described above.

As further shown in FIG. 5, process 500 may include determining, based on the initial fiberoptic network simulation and the respective weighted highways scores of the one or more links of the initial fiberoptic network simulation, a final fiberoptic network simulation (block 560). For example, the device (e.g., using computing resource 224, processor 320, memory 330, storage component 340, input component 350, output component 360, communication interface 370, and/or the like) may determine, based on the initial fiberoptic network simulation and the respective weighted highways scores of the one or more links of the initial fiberoptic network simulation, a final fiberoptic network simulation, as described above.

As further shown in FIG. 5, process 500 may include causing, based on the final fiberoptic network simulation, one or more actions to be performed (block 570). For example, the device (e.g., using computing resource 224, processor 320, memory 330, storage component 340, input component 350, output component 360, communication interface 370, and/or the like) may cause, based on the final fiberoptic network simulation, one or more actions to be performed, as described above.

Process 500 may include additional implementations, such as any single implementation or any combination of implementations described below and/or in connection with one or more other processes described elsewhere herein.

In a first implementation, process 500 includes determining, based on the final fiberoptic network simulation, new links to be constructed; determining an estimated cost associated with constructing the new links; determining, based on a different network simulation, alternative new links to be constructed; determining an estimated cost associated with constructing the alternative new links; determining a recommendation based on comparing the estimated cost associated with constructing the new links and the estimated cost associated with constructing the alternative new links; and sending the recommendation to a client device.

In a second implementation, alone or in combination with the first implementation, the node data indicates a respective location of each target node of the plurality of target nodes.

In a third implementation, alone or in combination with one or more of the first and second implementations, the infrastructure data concerning the existing fiberoptic infrastructure identifies two or more separate fiberoptic infrastructure networks.

In a fourth implementation, alone or in combination with one or more of the first through third implementations, the configuration data includes at least one of: a representative cost of a link per a unit of distance; a threshold link length; a threshold number of links that are able to connect to a target node; or a threshold number of target nodes that are able to connect to the existing fiberoptic infrastructure.

In a fifth implementation, alone or in combination with one or more of the first through fourth implementations, process 500 includes identifying, based on the infrastructure data, two or more separate infrastructure networks; combining the two or more separate infrastructure networks into a single infrastructure network; determining, based on the node data and the configuration data, a plurality of potential links to connect the plurality of target nodes to the single infrastructure network; and processing, using a point-to-point routing algorithm, the plurality of potential links to determine the initial fiberoptic network simulation that includes the one or more links.

In a sixth implementation, alone or in combination with one or more of the first through fifth implementations, process 500 includes processing, using a point-to-point routing algorithm, the respective weighted highways scores of the one or more links of the initial fiberoptic network simulation to determine the final fiberoptic network simulation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
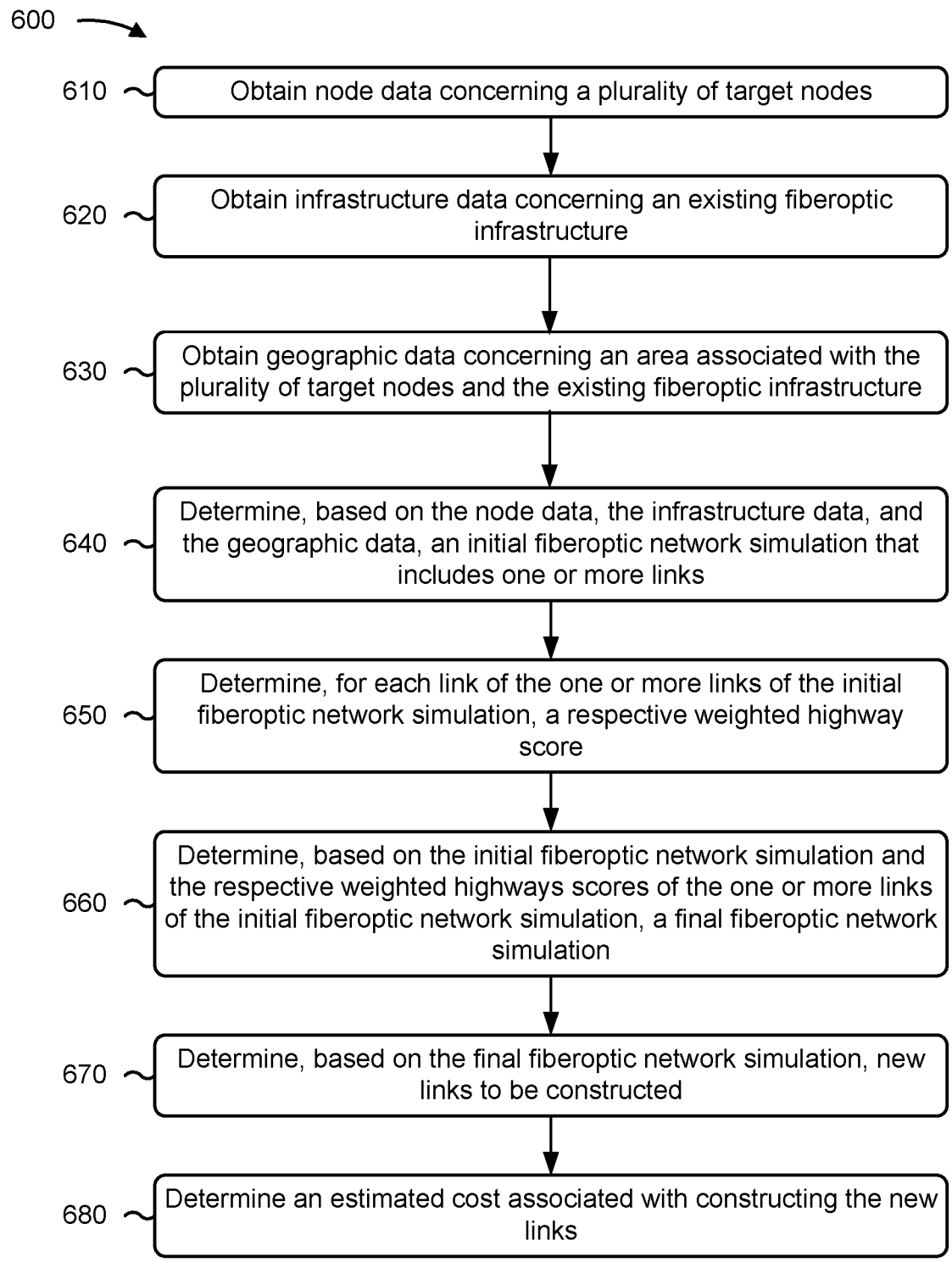

FIG. 6 is a flowchart of an example process 600 for determining a fiberoptic network simulation. In some implementations, one or more process blocks of FIG. 6 may be performed by a device (e.g., network simulation platform 220). In some implementations, one or more process blocks of FIG. 6 may be performed by another device or a group of devices separate from or including the device, such as a client device (e.g., client device 210) and/or the like.

As shown in FIG. 6, process 600 may include obtaining node data concerning a plurality of target nodes (block 610). For example, the device (e.g., using computing resource 224, processor 320, memory 330, storage component 340, input component 350, output component 360, communication interface 370, and/or the like) may obtain node data concerning a plurality of target nodes, as described above.

As further shown in FIG. 6, process 600 may include obtaining infrastructure data concerning an existing fiberoptic infrastructure (block 620). For example, the device (e.g., using computing resource 224, processor 320, memory 330, storage component 340, input component 350, output component 360, communication interface 370, and/or the like) may obtain infrastructure data concerning an existing fiberoptic infrastructure, as described above.

As further shown in FIG. 6, process 600 may include obtaining geographic data concerning an area associated with the plurality of target nodes and the existing fiberoptic infrastructure (block 630). For example, the device (e.g., using computing resource 224, processor 320, memory 330, storage component 340, input component 350, output component 360, communication interface 370, and/or the like) may obtain geographic data concerning an area associated with the plurality of target nodes and the existing fiberoptic infrastructure, as described above.

As further shown in FIG. 6, process 600 may include determining, based on the node data, the infrastructure data, and the geographic data, an initial fiberoptic network simulation that includes one or more links (block 640). For example, the device (e.g., using computing resource 224, processor 320, memory 330, storage component 340, input component 350, output component 360, communication interface 370, and/or the like) may determine, based on the node data, the infrastructure data, and the geographic data, an initial fiberoptic network simulation that includes one or more links, as described above.

As further shown in FIG. 6, process 600 may include determining, for each link of the one or more links of the initial fiberoptic network simulation, a respective weighted highway score (block 650). For example, the device (e.g., using computing resource 224, processor 320, memory 330, storage component 340, input component 350, output component 360, communication interface 370, and/or the like) may determine, for each link of the one or more links of the initial fiberoptic network simulation, a respective weighted highway score, as described above.

As further shown in FIG. 6, process 600 may include determining, based on the initial fiberoptic network simulation and the respective weighted highways scores of the one or more links of the initial fiberoptic network simulation, a final fiberoptic network simulation (block 660). For example, the device (e.g., using computing resource 224, processor 320, memory 330, storage component 340, input component 350, output component 360, communication interface 370, and/or the like) may determine, based on the initial fiberoptic network simulation and the respective weighted highways scores of the one or more links of the initial fiberoptic network simulation, a final fiberoptic network simulation, as described above.

As further shown in FIG. 6, process 600 may include determining, based on the final fiberoptic network simulation, new links to be constructed (block 670). For example, the device (e.g., using computing resource 224, processor 320, memory 330, storage component 340, input component 350, output component 360, communication interface 370, and/or the like) may determine, based on the final fiberoptic network simulation, new links to be constructed, as described above.

As further shown in FIG. 6, process 600 may include determining an estimated cost associated with constructing the new links (block 680). For example, the device (e.g., using computing resource 224, processor 320, memory 330, storage component 340, input component 350, output component 360, communication interface 370, and/or the like) may determine an estimated cost associated with constructing the new links, as described above.

Process 600 may include additional implementations, such as any single implementation or any combination of implementations described below and/or in connection with one or more other processes described elsewhere herein.

In a first implementation, the geographic data identifies one or more roads in the area associated with the plurality of target nodes and the existing fiberoptic infrastructure.

In a second implementation, alone or in combination with the first implementation, process 600 includes identifying, based on the node data, a respective location of each target node of the plurality of target nodes within the area; identifying, based on the geographic data, a respective location of each road of one or more roads in the area; identifying, based on the infrastructure data, two or more separate infrastructure networks in the area; combining the two or more separate infrastructure networks into a single infrastructure network in the area; determining, based on the respective location of each target node of the plurality of target nodes within the area and the respective location of each road of the one or more roads in the area, a plurality of potential links to connect the plurality of target nodes to the single infrastructure network; and processing, using a point-to-point routing algorithm, the plurality of potential links to determine the initial fiberoptic network simulation that includes the one or more links.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining node data related to a plurality of target nodes not connected to an existing infrastructure;
    obtaining existing link data related to a plurality of links between at least some of the plurality target nodes;
    determining, based on the node data and the existing link data, a plurality of potential links that connect the plurality of target nodes to the existing infrastructure;
    determining a set of potential links, of the plurality of potential links, based on one or more criteria;
    determining, based on the node data, the existing link data, and the set of potential links, an initial network simulation that includes one or more links of the set of potential links;
    determining, for each link of the one or more links, a respective weighted highway score based on a quantity of subsequent downstream target nodes dependent on a respective link of the one or more links;
    determining, based on the initial network simulation and the respective weighted highway score associated with the respective link of the one or more links of the initial network simulation, a final network simulation; and
    causing, based on the final network simulation, one or more actions to be performed.

2. The method of claim 1, wherein the respective weighted highway score indicates a quantity of subsequent downstream target nodes, of the plurality of target nodes, that are dependent on the respective link.

3. The method of claim 1, wherein the node data comprises building location data.

4. The method of claim 1, wherein the existing link data comprises fiberoptic infrastructure data.

5. The method of claim 1, wherein the final network simulation comprises a fiberoptic network simulation.

6. The method of claim 1, wherein causing the one or more actions to be performed comprises:
    determining, based on the final network simulation, new links to be constructed;
    determining an estimated cost associated with constructing the new links; and
    sending information related to the new links to be constructed and the estimated cost associated with constructing the new links to a client device to allow the client device to display the information on a display of the client device.

7. The method of claim 1, wherein the one or more criteria includes at least one of:
    a link cost criterion;
    a link length criterion;
    a network cost criterion; or
    a network length criterion.

8. The method of claim 1, wherein determining the set of potential links, of the plurality of potential links, based on the one or more criteria comprises:
    identifying one or more target nodes, of the plurality of target nodes, that are connected to a network element via one or more potential links of the plurality of potential links;
    determining, based on the one or more criteria, a respective path between the network element and each target node of the one or more target nodes, wherein the respective path includes at least one potential link of the plurality of potential links; and
    determining the set of potential links, of the plurality of potential links, based on the respective path associated with each target node of the one or more target nodes.

9. The method of claim 8, wherein an A* search algorithm or a point-to-point algorithm is used to determine the respective path between the network element and each target node of the one or more target nodes.

10. The method of claim 1, wherein determining the final network simulation comprises:

identifying a network element associated with the initial network simulation and one or more target nodes, of the plurality of target nodes, that are connected to the network element;

determining, based on the respective weighted highway score associated with each link of the one or more links of the initial network simulation, a respective path between the network element and each target node of the one or more target nodes; and determining, based on the respective path between the network element and each target node of the one or more target nodes, the final network simulation.

11. A device, comprising:
one or more memories; and
one or more processors coupled to the one or more memories and configured to:
  obtain node data related to a plurality of target nodes not connected to an existing infrastructure;
  obtain existing link data related to a plurality of links between at least some of the plurality target nodes;
  determine, based on the node data and the existing link data, a plurality of potential links that connect the plurality of target nodes to the existing infrastructure;
  determine a set of potential links, of the plurality of potential links, based on one or more criteria;
  determine, based on the node data, the existing link data, and the set of potential links, an initial network simulation that includes one or more links of the set of potential links;
  determine, for each link of the one or more links, a respective weighted highway score based on a quantity of subsequent downstream target nodes dependent on a respective link of the one or more links;
  determine, based on the initial network simulation and the respective weighted highway score associated with the respective link of the one or more links of the initial network simulation, a final network simulation; and cause, based on the final network simulation, one or more actions to be performed.

12. The device of claim 11, wherein the respective weighted highway score indicates a quantity of subsequent downstream target nodes, of the plurality of target nodes, that are dependent on the respective link.

13. The device of claim 11, wherein the node data comprises building location data.

14. The device of claim 11, wherein the existing link data comprises fiberoptic infrastructure data.

15. The device of claim 11, wherein the final network simulation comprises a fiberoptic network simulation.

16. The device of claim 11, wherein the one or more processors when causing the one or more actions to be performed, are configure to:
  determine, based on the final network simulation, new links to be constructed;
  determine an estimated cost associated with constructing the new links; and
  send information related to the new links to be constructed and the estimated cost associated with constructing the new links to a client device to allow the client device to display the information on a display of the client device.

17. The device of claim 11, wherein the one or more criteria includes at least one of:
a link cost criterion;
a link length criterion;
a network cost criterion; or
a network length criterion.

18. The device of claim 11, wherein the one or more processors, when determining the set of potential links, of the plurality of potential links, based on the one or more criteria, are configured to:
  identify one or more target nodes, of the plurality of target nodes, that are connected to a network element via one or more potential links of the plurality of potential links;
  determine, based on the one or more criteria, a respective path between the network element and each target node of the one or more target nodes,
  wherein the respective path includes at least one potential link of the plurality of potential links; and
  determine the set of potential links, of the plurality of potential links, based on the respective path associated with each target node of the one or more target nodes.

19. The device of claim 11, wherein the one or more processors, when determining the final network simulation, are configured to:
  identify a network element associated with the initial network simulation and one or more target nodes, of the plurality of target nodes, that are connected to the network element;
  determine, based on the respective weighted highway score associated with each link of the one or more links of the initial network simulation, a respective path between the network element and each target node of the one or more target nodes; and
  determine, based on the respective path between the network element and each target node of the one or more target nodes, the final network simulation.

20. A non-transitory computer-readable medium storing instructions, the instructions comprising:
one or more instructions that, when executed by one or more processors of a device, cause the one or more processors to:
  obtain node data related to a plurality of target nodes not connected to an existing infrastructure;
  obtain existing link data related to a plurality of links between at least some of the plurality target nodes;
  determine, based on the node data and the existing link data, a plurality of potential links that connect the plurality of target nodes to the existing infrastructure;
  determine a set of potential links, of the plurality of potential links, based on one or more criteria;
  determine, based on the node data, the existing link data, and the set of potential links, an initial network simulation that includes one or more links of the set of potential links;
  determine, for each link of the one or more links, a respective weighted highway score based on a quantity of subsequent downstream target nodes dependent on a respective link of the one or more links;
  determine, based on the initial network simulation and the respective weighted highway score associated with the respective link of the one or more links of the initial network simulation, a final network simulation; and
  cause, based on the final network simulation, one or more actions to be performed.

* * * * *